United States Patent
Rogers

(10) Patent No.: US 7,585,024 B2
(45) Date of Patent: Sep. 8, 2009

(54) PRE-CRASH SEAT POSITIONING MECHANISM

(75) Inventor: Robert F. Rogers, Orion, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 11/902,056

(22) Filed: Sep. 18, 2007

(65) Prior Publication Data

US 2009/0072596 A1 Mar. 19, 2009

(51) Int. Cl.
- B60R 2/42 (2006.01)
- B60R 2/427 (2006.01)
- B60R 21/00 (2006.01)
- B60R 21/013 (2006.01)
- B60R 21/0132 (2006.01)

(52) U.S. Cl. ............................ 297/216.17
(58) Field of Classification Search ............ 297/216.16, 297/216.17

See application file for complete search history.

(56) References Cited

U.S. PATENT DOCUMENTS

| | | | | |
|---|---|---|---|---|
| 5,451,094 A | * | 9/1995 | Templin et al. | 297/216.17 |
| 6,109,691 A | * | 8/2000 | Gray et al. | 297/216.17 |
| 6,182,783 B1 | * | 2/2001 | Bayley | 297/216.17 X |
| 6,193,297 B1 | * | 2/2001 | Vandermolen | 297/216.17 X |
| RE37,123 E | * | 4/2001 | Templin et al. | 297/216.17 |
| 6,322,140 B1 | * | 11/2001 | Jessup et al. | 297/216.17 |
| 6,582,015 B2 | * | 6/2003 | Jessup et al. | 297/216.17 |
| 7,413,247 B2 | * | 8/2008 | Van Druff et al. | 297/216.17 |

* cited by examiner

Primary Examiner—Rodney B White
(74) Attorney, Agent, or Firm—Foley & Lardner LLP

(57) ABSTRACT

An occupant protection system for a vehicle includes a vehicle seat, a seat moving mechanism configured to move the vehicle seat in a substantially vertical direction, and a vehicle rollover sensor signaling a safety controller. The safety controller determines if a rollover situation is imminent or is occurring. The seat moving mechanism may include a motor and a linkage system. When the safety controller determines a rollover situation, the seat moving mechanism moves the seat in a substantially downward direction from an initial position to increase a head clearance for a vehicle occupant seated in the vehicle seat.

17 Claims, 6 Drawing Sheets

PRE-CRASH SEAT POSITIONING MECHANISM

BACKGROUND

The present invention relates generally to the field of occupant protection devices. More specifically, the present invention relates to a rollover situation occupant protection device that is configured to increase a head clearance for an occupant seated on an occupant seat.

In some conventional vehicles, if a rollover situation occurs, a vehicle occupant seated on a vehicle seat may contact a vehicle ceiling. When the vehicle is inverted, there is a risk of the roof of the vehicle being crushed into the occupant. Furthermore, the vehicle occupant may move around in the seat during a rollover situation such that any clearance between the vehicle occupant and ceiling is reduced and the occupant may obtain injuries from contacting the ceiling.

SUMMARY

One exemplary embodiment relates to an occupant protection system for a vehicle. The occupant protection system comprises: a vehicle seat with a seat bottom and a seat back; a seat moving mechanism configured to move the vehicle seat in a substantially vertical direction; a vehicle rollover sensor to determine if a rollover situation is imminent or is occurring; and a motor for the seat moving mechanism. When the sensor sends a signal to a safety controller, and the safety controller determines a rollover situation, the seat moving mechanism moves the seat in a substantially downward vertical direction from an initial position to increase a head clearance for a vehicle occupant seated in the vehicle seat.

Another exemplary embodiment relates to a method of providing additional clearance for an occupant during a rollover situation. The method comprises: determining, with a rollover sensor and a safety controller, if a vehicle rollover is imminent; and moving a vehicle seat in a substantially downward direction upon sensing of an imminent vehicle rollover and increasing a distance between the vehicle seat and a vehicle ceiling to increase a head clearance of an occupant seated on the vehicle seat.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
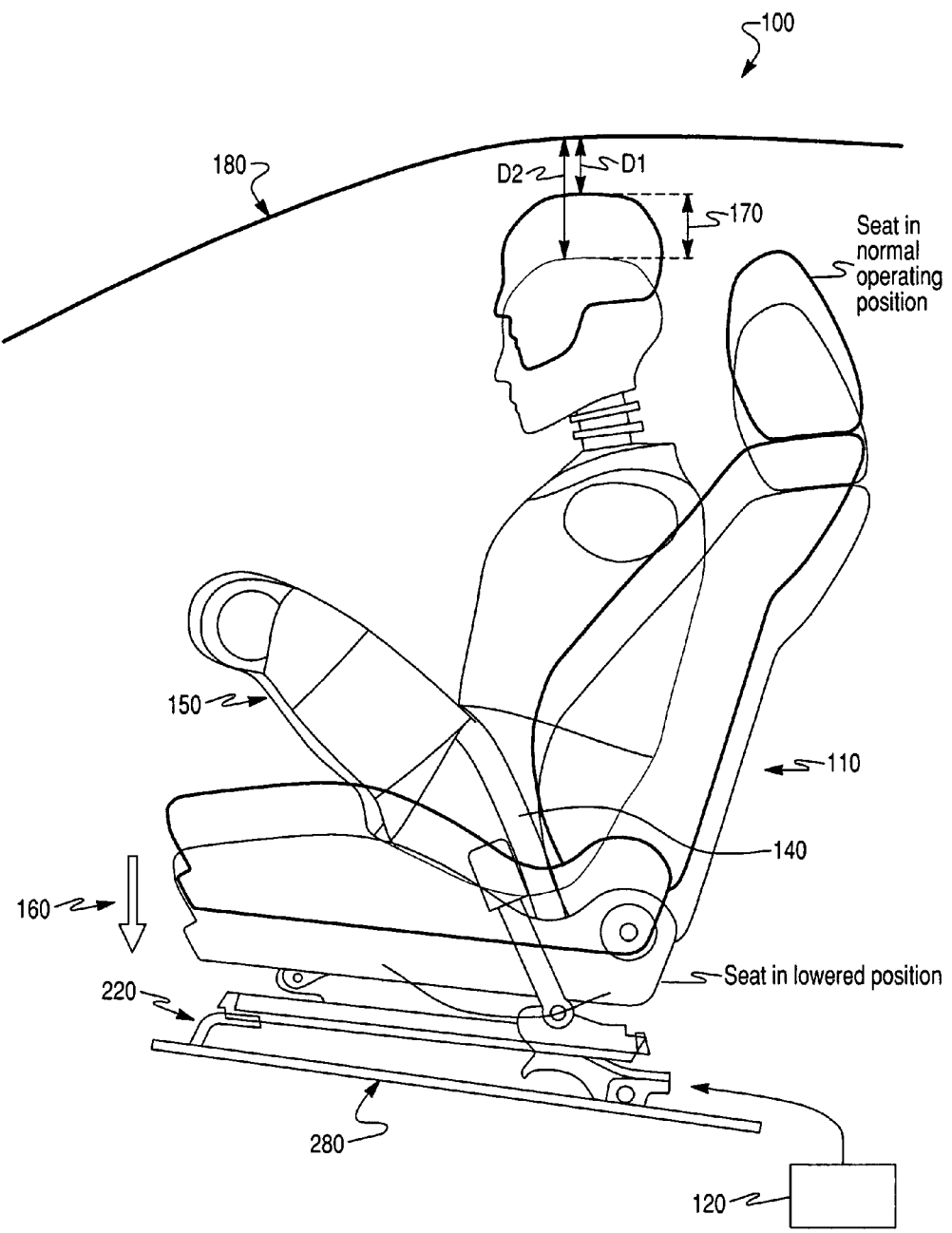
FIG. 1 is a side view of a vehicle occupant protection system.

Referring generally to the Figures, a vehicle occupant protection system 100, more specifically a pre-crash seat positioning mechanism, and related components are shown according to exemplary embodiments. Occupant protection system 100 generally includes: a vehicle component upon which a vehicle occupant 150 sits, shown as a vehicle seat 110; a vehicle situational sensing device, shown as a rollover sensor 120; an automatic, mechanical moving apparatus used for moving a vehicle component, shown as a seat moving mechanism 130; and a vehicle restraint system shown as a seatbelt 140.

Figure 2:
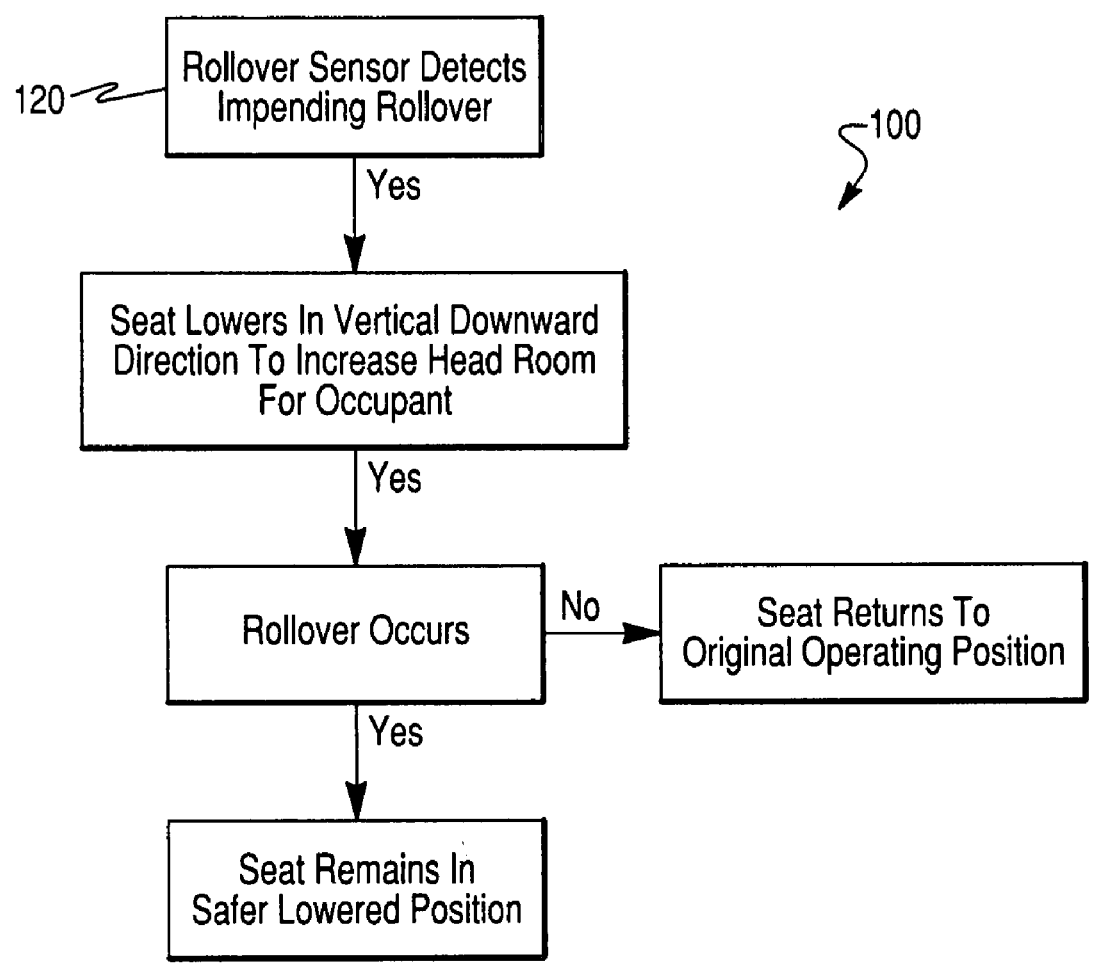
FIG. 2 is a flow chart of a vehicle occupant protection system illustrated in FIG. 1.
Figure 6:
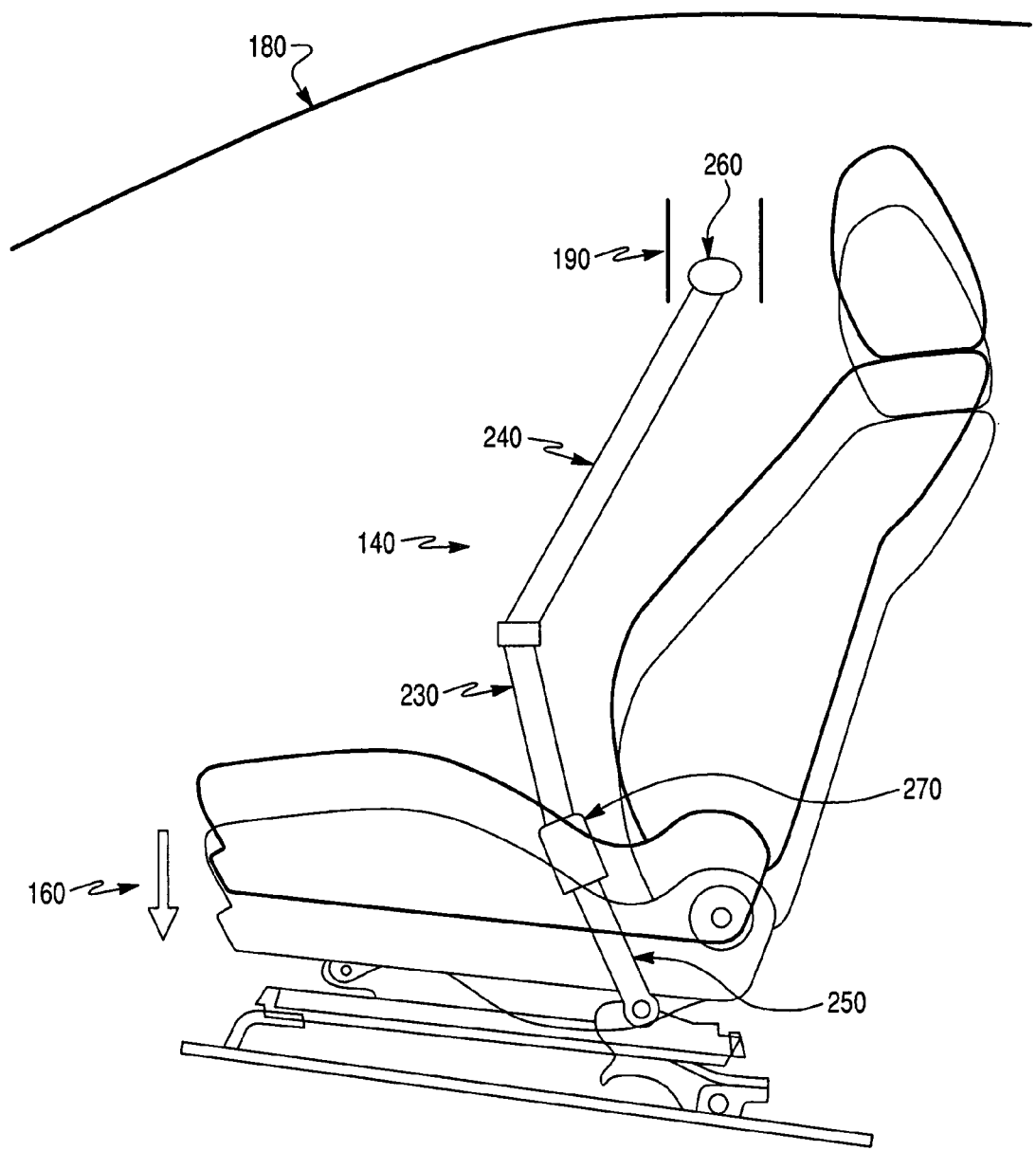
FIG. 6 is a side view of a vehicle seat and seatbelt configured to work in conjunction with a system for moving the seat in a vertical direction as shown in FIG. 1.

As shown in FIG. 1 and FIG. 2, occupant protection system provides a modified seating orientation for vehicle occupant 150 by moving vehicle seat 110 in a downward vertical direction 160 prior to or during a vehicle rollover event that has been anticipated by rollover sensor 120 and/or a safety controller 125, thereby increasing the head clearance between vehicle occupant 150 and a vehicle ceiling 180. FIG. 2 discloses a process 100 for operating the protecting system. Further protection to the vehicle occupant 150 may be provided by the tensioning of seatbelt 140 that occurs as vehicle seat 110 is lowered in downward vertical direction 160 and as seatbelt 140 remains attached to a vehicle body component 190 (such as shown in FIG. 6). Should the anticipated rollover not occur, vehicle seat 110 may be returned to an original operating position.

Figure 3:
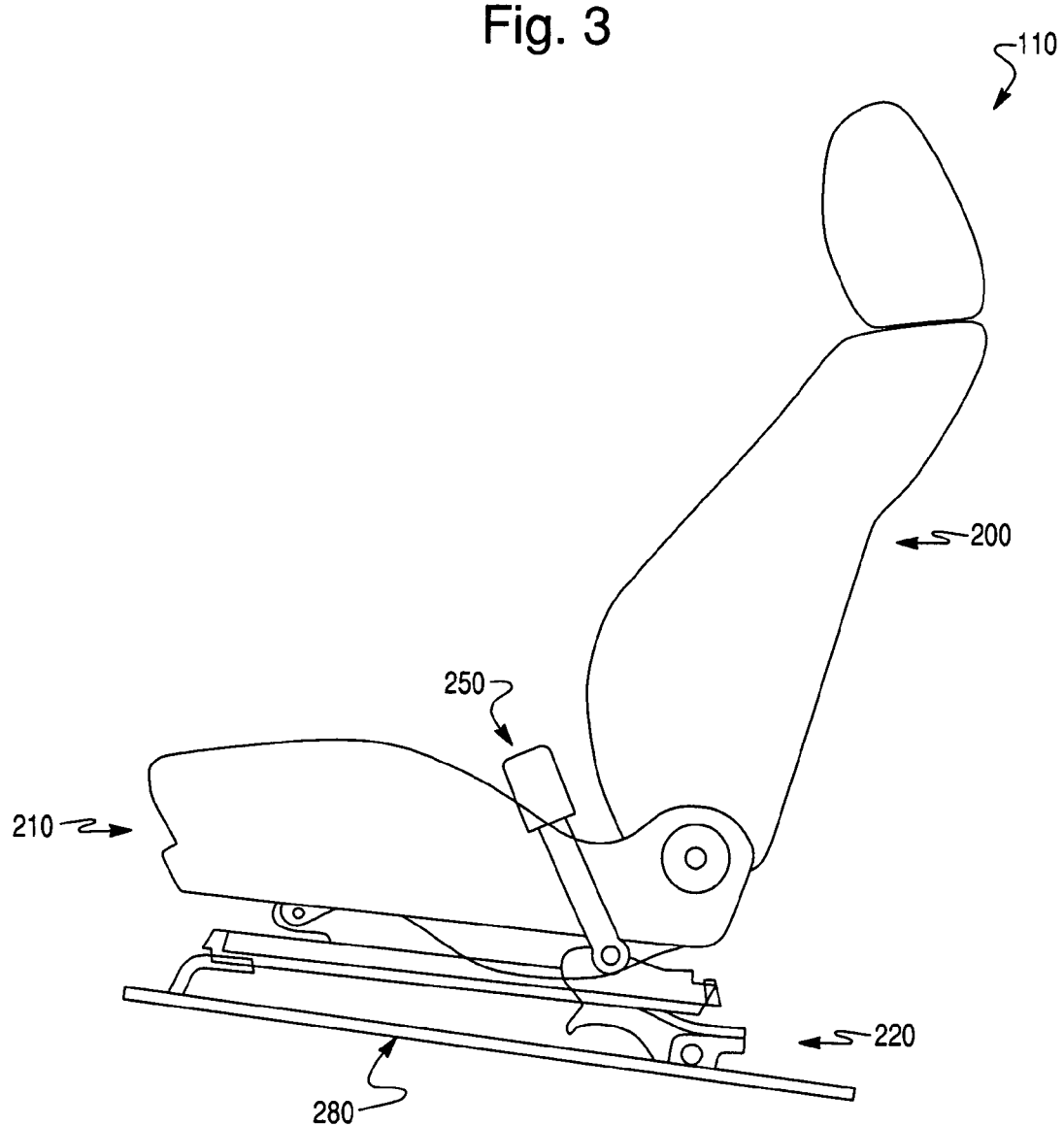
FIG. 3 is a side view of basic components of a vehicle seat.

As shown in FIG. 3, vehicle seat 110 includes a seat back 200 and a seat bottom 210, on which vehicle occupant 150 is situated. Vehicle seat 110 may be a front driver seat, a front passenger seat, a rear passenger seat, etc. or any combination thereof and is affixed (i.e. bolted, screwed, welded, etc.) to a vehicle floor 280 by means of legs or feet that comprise a seat frame 220. Any number of conventional seat frame designs may be employed with the protection system disclosed herein. Seat frame 220 may include the control system 300 necessary to move vehicle seat 110 in a downward vertical direction.

Figure 4:
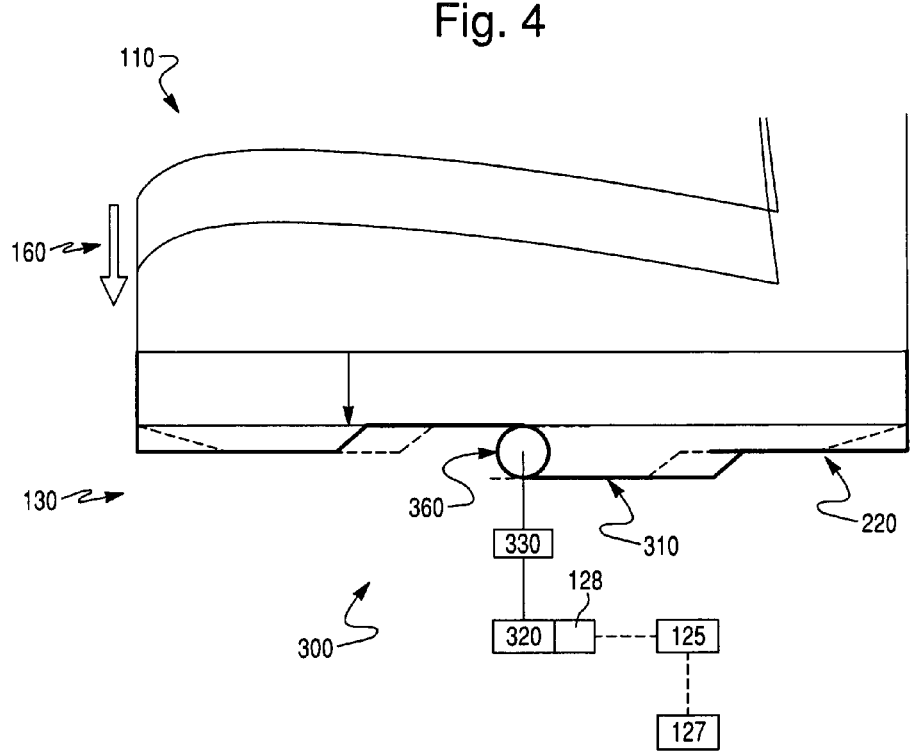
FIG. 4 is a side view of a vehicle seat bottom and seat control system according to an exemplary embodiment.

As shown in FIG. 4, the control system 300 may generally include a linkage mechanism 310 which attaches to the feet of seat frame 220 and moves vehicle seat 110 between a raised and lowered position. The linkage mechanism 310 may be driven by a motor 320. The linkage mechanism 310 may be driven by a gear 360 in conjunction with the motor 320. The linkage mechanism 310 and motor 320 may incorporate a clutch 330 to hasten the vertical movement of vehicle seat 110. Linkage 310, attached to seat frame 220, determines the vehicle seat's 110 vertical position as controlled by a safety controller 125. The safety controller may include a microprocessor or suitable circuitry to implement the process disclosed in FIG. 2, for example. In another embodiment, the sensor 120 (and/or additional sensors) may include processors so that a separate safety controller may be omitted. Also, communications between the various system components may be carried by direct wiring or a communication bus (e.g., CAN bus) used for other devices in the vehicle.

The clutch 330 may be utilized in such a manner that the force of gravity and/or the weight of the vehicle occupant 150 initiates and further aids in lowering the vehicle seat 110 at a more rapid pace than if the linkage 310 were driven by the motor 320 alone. Once the vehicle seat 110 is lowered, the seat 110 remains locked in position until the safety controller 125 signals the motor 320, optionally via a motor controller 128, to return the vehicle seat 110 to the original (initial) operating position.

Figure 5:
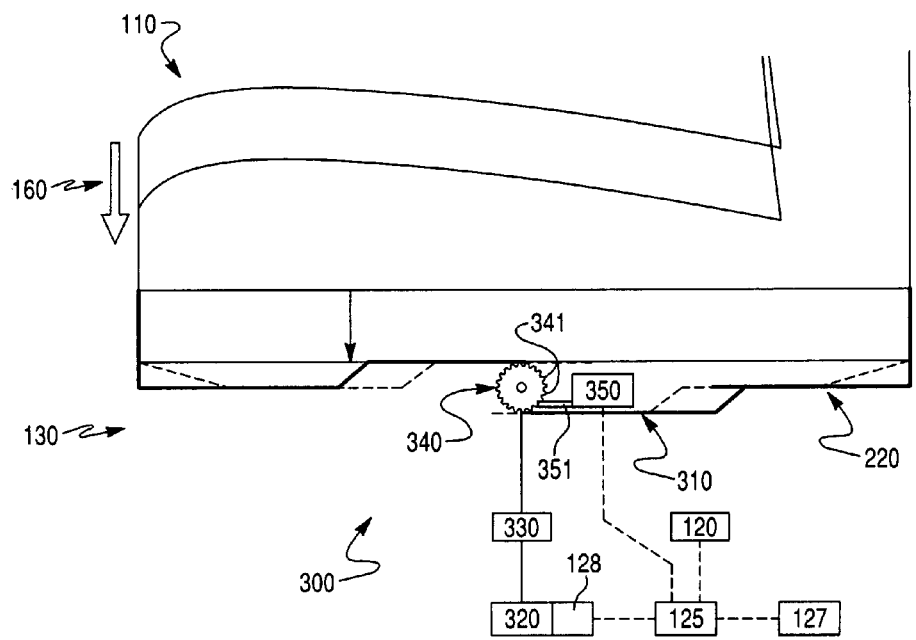
FIG. 5 is a side view of a vehicle seat bottom and seat control system according to the arrangement shown in FIG. 4 and further including a seat holding device.

As shown in FIG. 5, the control system 300 may also include a holding pawl 351 incorporated to hold the vehicle seat 110 in an upright (initial) or downward position. Holding pawl 351 may be actuated by an electromechanical device, such as a solenoid 350, or by the drive direction of motor 320.

Referring again to FIGS. 1, 2, 4, and 5, according to an exemplary embodiment, occupant protection system 100, or a pre-crash seat positioning mechanism is shown. The rollover sensor 120, located within a control system 300 of a vehicle (or other suitable location), senses a parameter and sends a signal to the safety controller 125, which may anticipate a rollover situation. In the control system 300, one or more sensors 122, such as the rollover sensor 120, sense a safety parameter (such as speed, angular velocity, braking, or any other suitable parameter) and sends a signal to the safety controller 125. The safety controller 125 determines if a rollover situation is imminent or is occurring. The safety controller 125 operates a motor controller 128 which controls (turns on or off, etc.) a motor 320. The safety controller 125 also may control the operation of one or more airbag modules 127 in the vehicle, and other safety devices (such as a seat belt pretensioner, etc.).

In FIG. 4, the motor 320 (and linkage 310) works in conjunction with the clutch 330 to lower the vehicle seat when a rollover situation is determined by the safety controller 125. Referring to FIG. 5, the motor 320 moves/controls the retractable holding pawl 351. The holding pawl 351, in its extended state (shown in FIG. 5), interacts with the gear teeth 341 of a moveable (rotatable) holding device 340 (e.g. a gear) to assist in keeping the vehicle seat 110 in the initial operation position. When a rollover situation is determined by the safety controller 125, the safety controller 125 sends a signal to control the motor controller 128, which controls the solenoid 350 by energizing or de-energizing the solenoid to retract the pawl 351. Thus, the gear 340 is released by the pawl 351, which allows the seat 110 to move downward. The solenoid 350 may also operate directly with a gear (not shown) and/or linkage 310 in order to move the position of the vehicle seat 110. Furthermore, the holding device 340 is reversible. Thus, after the rollover situation has not occurred, or a rollover situation is determined to not have occurred, the device 340 may rotate in a reverse direction (or backwards) and the pawl 351 can extend to interact with one or more of the teeth 341 to move the seat 110 (in conjunction with the linkage 310) to the initial operating position.

Should a rollover situation occur, the vehicle seat 110 adjusts in a downward vertical direction 160, thus increasing the clearance between the occupant's head and the vehicle ceiling 180. Should the anticipated rollover occur, vehicle seat 110 remains in its lowered position. Should rollover sensor 120 determine that a rollover situation did not occur, vehicle seat 110 moves in an upward vertical direction to the initial operating position.

For example, an occupant 150 may have an initial clearance (when the vehicle seat 110 is in a normal operation position) of D1. When the seat 110 moves in a downward direction 160 due to the rollover sensor 120 sensing a potential rollover situation, the seat 110 moves to a lower position (as shown in FIG. 1). The occupant 150 has a head clearance of D2 in the lower position. Thus, the seat 110 can move a total distance of D3, or D2-D1. The actual amount of clearance will vary depending upon the type of seat 110, type of vehicle, size of the occupant 150, any other possible factors. For exemplary purposes only, the seat 110 may move downward a total of approximately two inches or less. In another embodiment, the seat 110 may move downward approximately one to two inches.

As shown in FIG. 6, seatbelt 140 can include a lap portion 230, to restrain the lower body of vehicle occupant 150 in the event of a vehicle crash, and a shoulder portion 240, to restrain the upper body of vehicle occupant 150 in the event of a vehicle crash. Lap portion 230 and shoulder portion 240 may comprise one continuous piece, two separate pieces, or any combination thereof. At a proximal point of seatbelt 140, shoulder portion 240 may be fastened (i.e. by screws, bolts, adhesives, etc.) to vehicle body component 190 utilizing a shoulder anchor 260. At a distal point of seatbelt 140, a lap anchor 250 is secured (i.e. by screws, bolts, adhesives, etc.) to vehicle seat 110 and serves as a retention means for a seatbelt buckle 270 which may be attached to lap portion 230.

As shown in the embodiment of FIG. 6, as vehicle seat 110 seat moves in downward vertical direction 160, lap portion 230 also moves in downward vertical direction 160. The downward vertical movement of the lap anchor 250 causes seatbelt 140 to pretension as long as shoulder portion 240 of seatbelt 140 remains mounted to vehicle body component 190. Vehicle dynamics initiate a seatbelt retractor to lock and prevent seatbelt webbing extraction to occur in the opposite direction.

Figure 7:
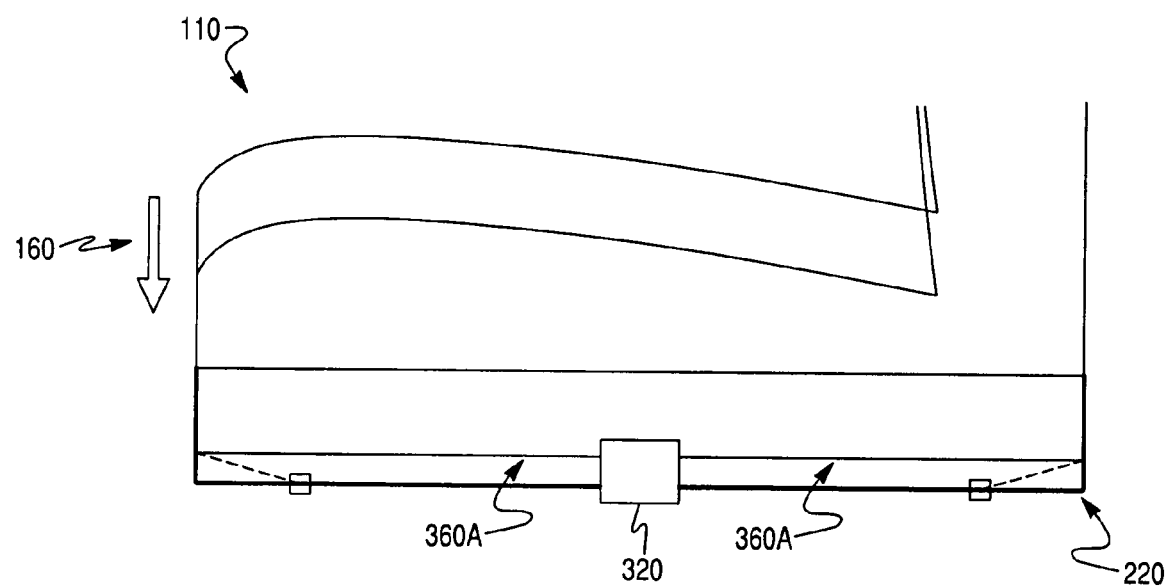
FIG. 7 is a side view of a vehicle seat bottom and seat control system according to another exemplary embodiment

In another exemplary embodiment shown in FIG. 7, movement of vehicle seat 110 can be accomplished as follows. Linkage 310, attached to seat frame 220, determines vehicle seat 110 vertical position as dictated by the algorithm of rollover sensor 120. Linkage 310 may be driven by motor 320 and a worm gear 360A.

According to another embodiment, the system for controlling the vertical movement of vehicle seat 110 includes linkage 310 attached to seat frame 220, wherein linkage 310 is driven by motor 320 and worm gear 360, and linkage 310 incorporates clutch 330 such that the combined weight of vehicle seat 110 and vehicle occupant 150 lowers vehicle seat 110 downward at a quicker pace than that of motor 320 alone.

According to various and alternative and exemplary embodiments, the occupant protection system as shown in the various figures can be configured or modified utilizing many different component options. As one skilled in the art of the invention can appreciate, various embodiments of the present invention are to be included as further embodiments of the present invention.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An occupant protection system for a vehicle, comprising:
   a vehicle seat with a seat bottom and a seat back;
   a seat moving mechanism configured to move the vehicle seat in a substantially vertical direction;
   a vehicle rollover sensor to determine if a rollover situation is imminent or occurring; and
   a motor for the seat moving mechanism,
   wherein when the sensor sends a signal to a safety controller, and the safety controller determines a rollover situation, the seat moving mechanism moves the seat in a substantially downward vertical direction from an initial position to increase a head clearance for a vehicle occupant seated in the vehicle seat, and wherein, if the safety controller determines that a rollover situation did not occur after the moving mechanism moves the seat in the downward vertical direction, the moving mechanism is configured to move the seat in a substantially upward vertical direction to return the seat to the initial position.

2. The occupant protection system of claim 1, wherein the seat moving mechanism includes a linkage mechanism.

3. The occupant protection system of claim 2, further including a clutch to move the vehicle seat in the downward vehicle direction.

4. The occupant protection system of claim 1, a vehicle seat with a seat bottom and a seat back;

a seat moving mechanism configured to move the vehicle seat in a substantially vertical direction, wherein the seat moving mechanism includes a worm gear;

a vehicle rollover sensor to determine if a rollover situation is imminent or occurring; and a motor for the seat moving mechanism, wherein when the sensor sends a signal to a safety controller, and the safety controller determines a rollover situation, the seat moving mechanism moves the seat in a substantially downward vertical direction from an initial position to increase a head clearance for a vehicle occupant seated in the vehicle seat.

5. The occupant protection system of claim 1, further including a holding pawl to hold the seat in an initial upward direction position or a downward direction position.

6. The occupant protection system of claim 5, further comprising a solenoid configured to actuate the holding pawl.

7. The occupant protection system of claim 5, wherein a drive direction of the motor is configured to actuate the holding pawl.

8. The occupant protection system of claim 1, wherein the seat is capable of moving in the downward direction in a range of one to two inches.

9. The occupant protection system of claim 1, further comprising a lap anchor mounted to the seat and a seatbelt with a lap portion and a shoulder portion.

10. The occupant protection system of claim 9, further comprising a shoulder anchor mounted to a vehicle body component.

11. The occupant protection system of claim 10, wherein the seat is configured to pretension the seatbelt when the seat moves in the downward direction by the seat moving mechanism.

12. A method of providing additional clearance for an occupant during a rollover situation, comprising:

determining, with a rollover sensor and a safety controller, if a vehicle rollover is imminent;

moving a vehicle seat in a substantially downward direction upon sensing of an imminent vehicle rollover and increasing a distance between the vehicle seat and a vehicle ceiling to increase a head clearance of an occupant seated on the vehicle seat; and moving the vehicle seat in a substantially upward direction if the safety controller determines that a rollover situation did not occur after the moving mechanism moves the seat in the downward vertical direction.

13. The method of claim 12, wherein the vehicle seat comprises a seat moving mechanism with a linkage mechanism to move the seat in the substantially downward direction.

14. The method of claim 13, wherein the seat moving mechanism further includes a clutch to move the vehicle seat in the downward vehicle direction.

15. The method of claim 13, wherein the seat moving mechanism further includes a worm gear.

16. The method of claim 13, wherein the seat moving mechanism further includes a holding pawl to hold the seat in an initial upward direction position or a downward direction position.

17. The method of claim 12, wherein the seat is capable of moving in the substantially downward direction in a range of one to two inches.

* * * * *